United States Patent [19]

Muller

[11] Patent Number: 4,706,147
[45] Date of Patent: Nov. 10, 1987

[54] CASSETTE FOR CLEANING THE HEADS OF A MAGNETIC TAPE RECORDER

[76] Inventor: Hans Muller, Silvrettastrasse 14, 7000 Stuttgart 60, Fed. Rep. of Germany

[21] Appl. No.: 753,228

[22] Filed: Jul. 9, 1985

[30] Foreign Application Priority Data

Jan. 19, 1985 [DE] Fed. Rep. of Germany ..... 85014079

[51] Int. Cl.⁴ .............................................. G11B 5/41
[52] U.S. Cl. .................................... 360/128; 360/137
[58] Field of Search ............................... 360/128, 137

[56] References Cited

U.S. PATENT DOCUMENTS

| 4,065,801 | 12/1977 | Leaming ..................... 360/128 X |
| 4,158,871 | 6/1979 | Leaming ..................... 360/137 |
| 4,272,796 | 6/1981 | Van Kreuningen et al. ..... 360/128 |
| 4,514,777 | 4/1985 | Kudo ........................ 360/128 |

Primary Examiner—John H. Wolff
Attorney, Agent, or Firm—Murray and Whisenhunt

[57] ABSTRACT

A cleaning cassette for the read/write heads of magnetic tape recorders is disclosed in which an interchangeable cleaning device 23 is mounted to a supporting member 16. This supporting member can be moved back and forth manually or by means of a driving force being internal to the cassette, such as a spring.

17 Claims, 5 Drawing Figures

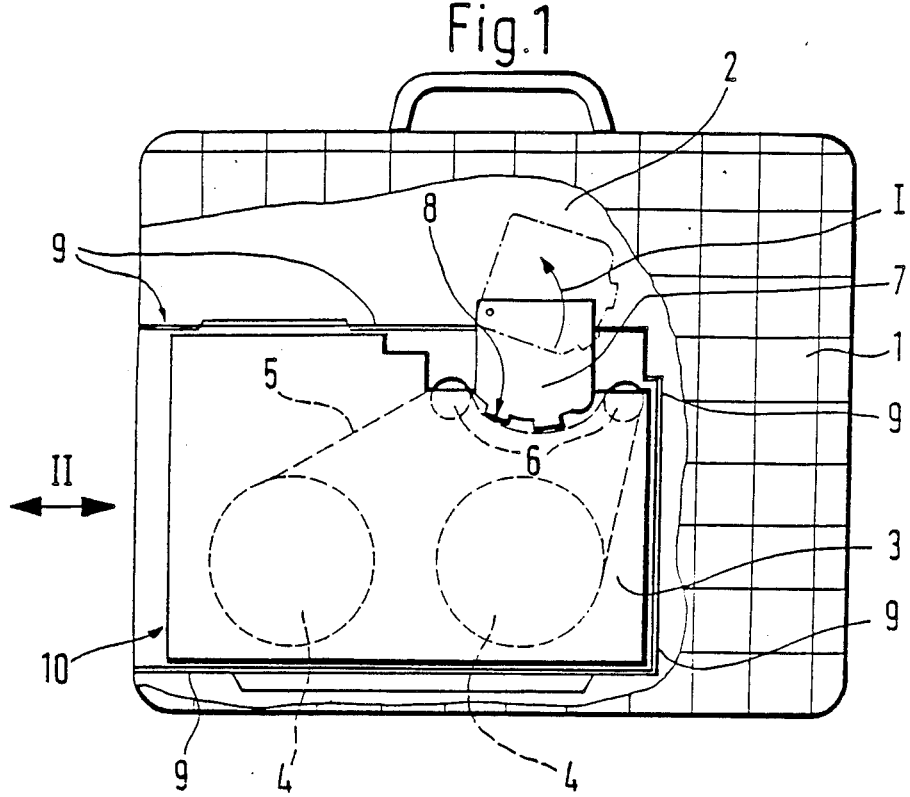
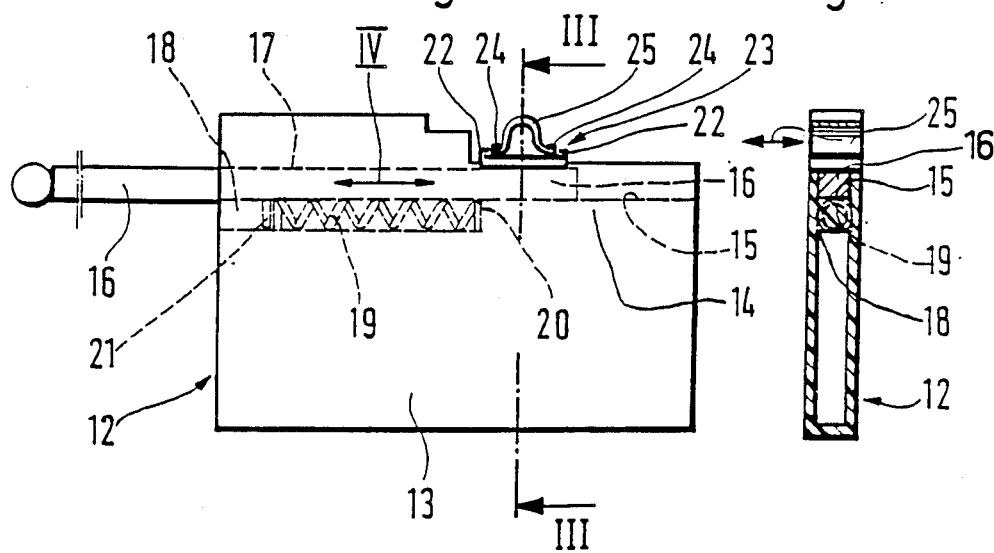

4,706,147

CASSETTE FOR CLEANING THE HEADS OF A MAGNETIC TAPE RECORDER

The invention relates to a cleaning cassette for cleaning the read/write heads of magnetic tape recorders.

BACKGROUND OF THE INVENTION

The read/write head of a magnetic tape recorder is particularly sensitive to contamination, since dirt in the form of abraded tape or metal particles can lead to read and write errors and can even result in storage failures or even loss of data. Since magnetic tape recorders of this kind are generally used for filing purposes, such failures are irreparable.

A problem with the cleaning of read/write heads of magnetic tape recorders consists in that the surfaces of these heads facing the magnetic tape are not level but slightly staggered. Furthermore, the read/write head can be swivelled away with some magnetic tape recorders in order to facilitate tape removal and to avoid damage to the recording surfaces or the tape, respectively, when unloading the tape cassette.

It should be noted after all that the read/write head of a magnetic tape recorder is usually cleaned every four to six operating hours.

A generic cleaning cassette disclosed by the prior art incorporates a tape guided within the cassette which is manually pulled past the read/write head to be cleaned after the cassette has been inserted, whereby particularly magnetic particles are abraded and carried away from the read/write head. Quite apart from the fact that such a cleaning cassette is relatively expensive it should be noted that the cleaning tape cannot be wider than the data medium of a normal recording cassette. This means that contaminations which are found beyond the lateral boundaries of the active strip of the read/write head are not removed but are rather drawn by magnetic attraction on to the recording strip of the head after the cleaning process. But even the cleaning effect on the recording strip (active strip) itself is insufficient because, as stated above, this strip on the read/write head is not level but has some degree of unevenness designed in, whereas a cleaning tape can only make contact with even surfaces owing to its shape. A magnetic tape data medium is generally driven by rollers which act upon the tape reels but cause significant contamination resulting from debris. This contamination being primarily found at the sides of the active strip cannot be removed by a cleaning tape.

Apart from the cleaning by means of a cleaning cassette, other cleaning methods are known, e.g. by means of a brush, which must be applied in addition to the use of a cleaning cassette in order to clean the areas at the sides of the active strip of the read/write head and to account for the fact that a cleaning cassette can only effect dry cleaning. Particularly in the case of additional contaminations by debris and also to reduce frictional magnetism, moist or wet cleaning using solvents becomes necessary. Moist or wet cleaning with a brush involves the risk that the dirt is only dislocated to inaccessible places or that the magnetic tape recorder and here especially the read/write head is damaged during the cleaning process. There can even result irreparable damage if recording errors or failures occur that remain undetected and will lead to gaps in the filed documents.

SUMMARY OF THE INVENTION

As opposed to the prior art, the present invention cleaning cassette offers the advantage that the cleaning member, by virtue of its elastic property, can adapt to the unevenness of the read/write head. In doing so, it is activated and supported by the suitably shaped retaining member of the cleaning member. Owing to the fact that the cleaning member may be wider than the tape supply path (tape running path), the areas at the sides of the tape path on the read/write head are thoroughly cleaned, too. Cleaning solvents may be applied to the cleaning member to achieve the necessary additional cleaning without touching members that must not come into contact with the solvent. Such an elastic cleaning member can be easily wetted with the solvent since it may consist of an absorbent material. The cleaning device is extendable beyond the length of the read/write head so that, by virtue of the elasticity of this cleaning member, the cleaning action may also cover the head areas which are found before or after the actual recording and reproducing areas seen in the direction of tape run. Owing to their location, these areas are usually also contaminated and prone to contamination, and the dirt accumulated there may drop onto the active head path if not being removed. As opposed to a cleaning tape that is only able to absorb a small amount of dirt per surface unit, the cleaning member of the present invention has an enormous dirt absorbing capacity. This offers the advantage of a very fast cleaning action so that the read/write head is completely cleaned after only a few wiping movements and can be used again without delay. It is not least possible to dry or wet clean the head in order to account for the various kinds of contaminations.

One advantageous embodiment of the present invention features a cleaning device mounted on a supporting member which can be moved with respect to and is guided within the cleaning cassette. Therefore, the cleaning cassette can be given the size and shape of a magnetic tape cassette and can be loaded in the magnetic tape recorder in the same way. By subsequent activation of the supporting member with the cleaning device, the cleaning cassette allows cleaning the read/write head area.

In another embodiment of the invention the cleaning member is removably attached to the supporting member, thus allowing the user to discard only the cleaning member after use and to re-use the cassette. With cleaning cassettes of the known type the entire cassette is discarded after use, which entails significant costs. Furthermore, the cleaning cassette as disclosed by the present invention can alternately or successively be used for wet and dry cleaning purposes. Another feature is that the cleaning member immediately shows the degree of contamination so that this inexpensive part can be replaced.

In yet another embodiment of the invention the cleaning member can be moved past the read/write head and is driven independently from the drive mechanism of the magnetic tape recorder. The invention allows any form of drive mechanism, that is, by the magnetic tape recorder itself just like the drive for the actual magnetic tape, or by hand from the outside, or by a drive mechanism housed inside the cleaning cassette.

Particularly in the case of manual operation from outside the cassette the retaining member features a slide bar which is guided across the operating direction in a retaining rail on the supporting member. This slide bar may have clamping jaws for mounting the cleaning member which may have the form of a tape being mounted to the ends of the retaining member and being curved outward. Due to this arrangement the cleaning member cannot only be fixtured very simply and securely but also retains its absorbing capacity even when it is moved past the read/write head under pressure. Thus, when a highly absorbing material is used as the cleaning member, the guides on the retaining member can be selected such that the material is compressed more at the beginning of the cleaning process than toward the end of the active length so that it re-expands while passing this length, absorbing the dirt.

In another embodiment of the invention the supporting member can be moved longitudinally and against a restoring force, preferably a spring, within the cleaning cassette. This requires a force acting in one direction only for operating the cleaning member, such as a manual force, while the reverse motion is effected by the restoring force. As described in the present invention the supporting member may be fastened to a handlebar which is guided in a recessed portion of the cleaning cassette. The guide of the handlebar also insures the exact guidance of the supporting member which is advantageous to the cleaning process.

In another embodiment of the invention the handlebar carries a handle which is accessible from outside the cleaning cassette, projecting to the outside through slots in the cleaning cassette walls and being installable to the handlebar by means of a coupling mechanism. This coupling mechanism may be a threaded joint, but also a snap-in joint, while the handlebar carries several coupling mechanisms of this kind to allow for different positions of the handle on the handlebar. Depending on the construction of the magnetic tape recorder there are different possibilities of access after the cassette has been loaded. With some recorders, the cassette can only be accessed from the narrow side, while others only permit access from below and yet others only from the front side, i.e. from the wide front face. This embodiment of the invention offers the advantage of allowing the use of only one cassette for different types of recorders, involving the fastening of the handle in different positions on the handlebar, depending on the type of recorder used.

In an alternative version of this additional embodiment of the invention the cleaning device cleaning device can be operated via a spring mechanism housed in the cassette, rather than by a manually operated handlebar. As soon as the cleaning cassette has been loaded in the magnetic tape recorder and the spring mechanism has been unlocked, the cleaning device is moved past the read/write head as with the manually operated version. Another embodiment which is suitable for magnetic tape recorders not offering access to the cleaning cassette from the outside features activation of the cleaning device directly by the motor of the magnetic tape recorder.

All embodiments of the invention offer the advantage that the cleaning member can be moistened particularly in its initial or final position by means of a moistening device within the cleaning cassette.

Further advantages and advantageous embodiments of the invention will be apparent from the following detailed description, the accompanying drawings and the claims.

BRIEF DESCRIPTION OF THE DRAWINGS

The drawings illustrate several variations of one embodiment of the object of the invention, which is subsequently described. The drawings show in simplified form:

FIG. 1 the side view of a magnetic tape recorder with a magnetic tape cassette loaded;

FIG. 2 a side view of the cleaning cassette of the form of the present invention;

FIG. 3 a cross-sectional view taken through line III—III of FIG. 2;

DESCRIPTION OF PREFERRED EMBODIMENT

Figure 4:
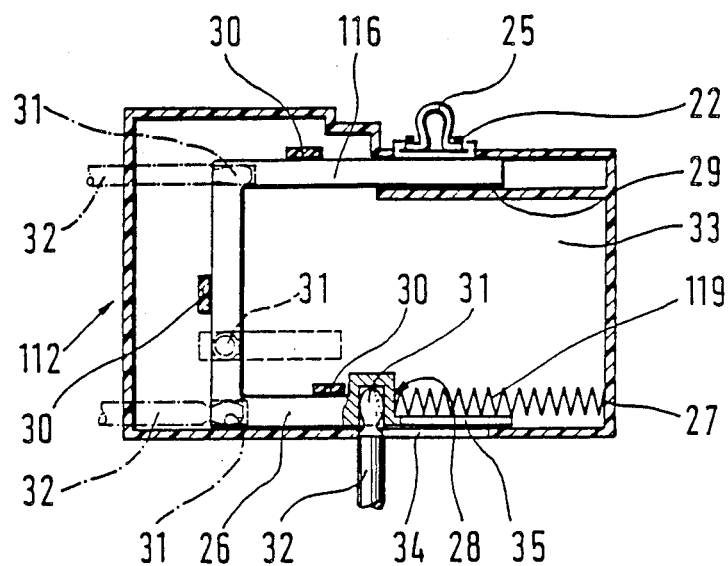
FIG. 4 a variation of this embodiment with alterable handle position.

FIG. 1 shows a side view of a magnetic tape recorder where a magnetic tape cassette 3 with tape reels 4 and tape 5 being outlined becomes visible in a partial cut-away 2 of the recorder enclosure. The magnetic tape 5 exits the magnetic tape cassette 3 over rollers 6 and makes contact with a read/write head of the magnetic tape recorder 1 at this point. This read/write head 7 may be swivelled upward to facilitate removal of the cassette 3, in the direction indicated by arrow I. Depending on the type of magnetic tape recorder this change of position may take different forms which are largely determined by the way in which the cassette is inserted in the recorder. The side of the read/write head 7 carrying the recording surface 8 and facing the magnetic tape 5 has in its entirely an uneven surface since it comes into the closest possible contact with the magnetic tape 5 only at the points which are essential for the recording function. The magnetic tape cassette 3 is inserted or removed, respectively, in the direction indicated by the double arrow II. The positioning of the cassette 3 required for the exact functioning of the read/write head 7 and thus the general positioning of the cassette with respect to the magnetic tape recorder 1 is established by guiding surfaces and stops 9 within the compartment 10 of the recorder 1 which accommodates the cassette 3.

FIG. 2 shows a side view of a cleaning cassette 12 of the present invention whose edge measurements are identical to those of the magnetic tape cassette 3 and which is interchangeable with the latter with regard to space requirements only so that it rests against the guiding surfaces and stops 9 of the compartment 10 (FIG. 1), thus assuming a defined position with respect to the read/write head 7.

While the lower part 13 of this cassette serves only space forming purposes, the upper part 14 contains a rectangular section guide recess 15 which is partly open at the top and in which a handlebar 16 is guided in the direction indicated by the double arrow IV, i. e. in a longitudinal direction. This handlebar 16 is kept from falling out by a casing section 17 which partially covers the guide recess 15 at the top. Also in a longitudinal direction there is a recess 18 below the guide recess 15 which contains a restoring spring 19. The restoring spring 19 is both mounted to one end 20 of the recess and to a web 21 which protrudes into the recess 18 and is connected to the handlebar 16.

In the portion of the guide recess 15 which is open at the top, a cleaning device, cleaning device 23 mounted to a retaining bar 22 is carried on the handlebar 16 in the direction of operation. This cleaning device may be pushed out across the direction of operation IV of the handlebar and may thus be replaced. The cleaning device has a retaining member 24 in the form of clamping straps which hold a tape 25 serving as the cleaning member. This tape yields in an elastic manner to any resistance as a result of the tape being clamped in a curved configuration and is preferably made of textile, yet absorbing material.

Operation of the described cleaning cassette is as follows: Following the insertion in the magnetic tape recorder 1 in the direction indicated by arrow II and following the swivelling down of the read/write head 7 into the position marked by solid lines in FIG. 1, the cleaning part 25 is situated to the left of this read/ write head. The handlebar 16 is then moved to the right from outside the magnetic tape recorder 1 (FIG. 1) and against the action of the restoring spring 19, which causes the cleaning member 25 to wipe along the side of the read/write head 7 facing the cleaning cassette 12. This results not only in the cleaning of the portions carrying the recording surfaces 8 of this head but also of the adjacent portions between, beside and behind them. As shown also in FIG. 3, the cleaning member 25 is approximately as wide as the cleaning cassette 12 and has thus the same width as the magnetic tape cassette and the read/write head 7. As soon as the cleaning member 25 is contaminated, the entire cleaning device is pushed out of the retaining bar 22 across the direction of operation and can thus be cleaned or replaced by a clean cleaning device.

In the variation of the preferred embodiment shown in FIG. 4, the entire interior space of the cleaning cassette is utilized. In this design, the handlebar 116 is U-shaped, with the retaining bar 22 mounted to the one free arm of the handlebar 116 and the restoring spring 119 mounted to the other free arm 26. The restoring spring 119 is supported both by the wall 27 of the cleaning cassette 112 and by the front face 28 of the free arm 26. The handlebar 116 is guided and held in its shown initial position by wall sections 29 and by cross webs 30 connecting the side walls. The handlebar 116 has apertures 31 of which only four are shown in the drawing and which allow the snap-in connection of a handle 32 which serves the purpose of moving the handlebar 116 or the cleaning member 25, respectively, depending on the access offered by the magnetic tape recorder. This snap-in connection serving as a coupling element between the handle 32 and the handlebar 116 may be designed by means known by the prior art. Thus the end of the handle 32 engaging the aperture 31 may be crowned if the aperture 31 in the handlebar is also of an appropriate, crowned design. The snap-in action may then be accomplished by virtue of the elasticity of the materials, e.g. plastic.

In order to largely seal the interior space 33 of the cleaning cassette 112 from the outside, a longitudinal groove 34 required for the actuation of the handle 32 which is shown in a built-in condition and protruding downward is covered by a lug 35 mounted to the handlebar 116 and following the longitudinal movement of the latter. In all other respects, the function of this variation is identical to that of the variation shown in FIG. 2 and FIG. 3.

Figure 5:
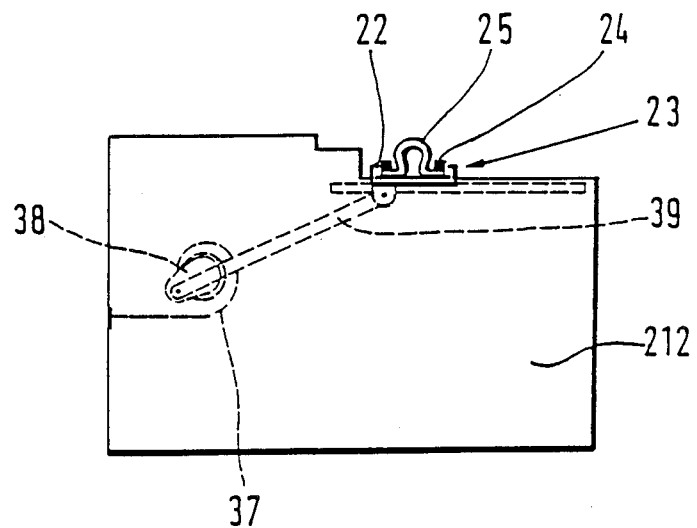
FIG. 5 another variation with the cleaning device being spring-operated.

FIG. 5 contains a schematic drawing of another variation. This drawing shows the cleaning member 25 with retaining member 24 and retaining bar 22 (as in FIG. 2) being operated by a spiral spring 37 which acts on the cleaning 23 over a crank 38 and a rod 39, thus causing it to swing back and forth. Of course it is also possible to use any other driving force instead of the spiral spring and to replace the crank drive by any other drive mechanism. The characteristic feature in any case is that the cleaning 23 is driven by one of these driving forces internal to the cleaning cassette 212.

I claim:

1. A cleaning cassette for cleaning a read/write head of a magnetic tape recorder, said cassette comprising:
   a cassette body;
   a supporting member reciprocally housed in said cassette body, said supporting member having a support surface facing the read/write head of the recorder;
   a cleaning device mounted on said support surface for cleaning said read/write head upon reciprocal movement of said supporting member, said cleaning device including a cleaning member having a smooth flexible cleaning surface, said cleaning surface curving generally outwardly from said support surface and having an elasticity such that reciprocal movement of said cleaning member past said read/write head results in said cleaning surface continuously contacting said read/write head and matingly contouring about said read/write head to clean said read/write head in both directions of said reciprocal movement.

2. A cleaning cassette according to claim 1, wherein said cleaning member consists of a tape curved outwardly from said support surface.

3. A cleaning cassette according to claim 2, wherein said tape is interchangeable on said support member.

4. A cleaning cassette according to claim 1, 2 or 3, wherein said cleaning member has a retaining member, said cleaning member being mounted by said retaining member to a holder, said holder being mounted such that said cleaning member is displaceable transversely to the direction of said reciprocal movement of said supporting member.

5. A cleaning cassette according to claim 4, wherein said retaining member is in the form of clamping straps for holding said tape.

6. A cleaning cassette according to claim 1, wherein said cleaning member consists of an absorbent material.

7. A cleaning cassette according to claim 6, wherein said cleaning member is an absorbent textile material.

8. A cleaning cassette according to claim 1, wherein said support member is movable against a restoring force.

9. A cleaning cassette according to claim 8, wherein said restoring force is provided by a spring within said cassette body.

10. A cleaning cassette according to claim 8, wherein said supporting member comprises a handle bar, said handle bar being guided within said cassette body and being movable into an initial position by said restoring force.

11. A cleaning cassette according to claim 10, wherein said handle bar includes a handle, said handle protruding through a groove in an exterior wall of said cassette body, said handle being coupleable into an aperture in said handle bar.

12. A cleaning cassette according to claim 11, wherein said handle bar includes several apertures for different positions of said handle.

13. A cleaning cassette according to claim 12, wherein said handle is coupleable to said handle bar by a snap-in connection.

14. A cleaning cassette according to claim 10, wherein said handle bar is U-shaped and is guided at its arms within said cassette body.

15. A cleaning cassette according to claim 1, wherein said cleaning device is driven by a spring mechanism situated within said cassette body.

16. A cleaning cassette according to claim 1, wherein said cassette is packaged together with a number of cleaning devices.

17. A cleaning cassette according to claim 16, wherein said cassette is packaged with said cleaning devices and a liquid container.

* * * * *

REEXAMINATION CERTIFICATE (2402nd)
United States Patent
Muller

[11] B1 4,706,147
[45] Certificate Issued  Sep. 27, 1994

[54] CASSETTE FOR CLEANING THE HEADS OF A MAGNETIC TAPE RECORDER

[76] Inventor: Hans Muller, Silvrettastrasse 14, 7000 Stuttgart 60, Fed. Rep. of Germany

Reexamination Request:
No. 90/003,250, Nov. 5, 1993

Reexamination Certificate for:
Patent No.: 4,706,147
Issued: Nov. 10, 1987
Appl. No.: 753,228
Filed: Jul. 9, 1985

[30] Foreign Application Priority Data

Jan. 19, 1985 [DE] Fed. Rep. of Germany .................. 85014079[U]

[51] Int. Cl.$^5$ .................................. G11B 5/41
[52] U.S. Cl. ........................... 360/128; 360/137
[58] Field of Search ..................... 360/128, 137

[56] References Cited
U.S. PATENT DOCUMENTS
4,442,468  4/1984  d'Alayer de Costemore d'Arc ................................ 360/128

FOREIGN PATENT DOCUMENTS
8404840  6/1984  Denmark .

Primary Examiner—John H. Wolff

[57] ABSTRACT

A cleaning cassette for the read/write heads of magnetic tape recorders is disclosed in which an interchangeable cleaning device 23 is mounted to a supporting member 16. This supporting member can be moved back and forth manually or by means of a driving force being internal to the cassette, such as a spring.

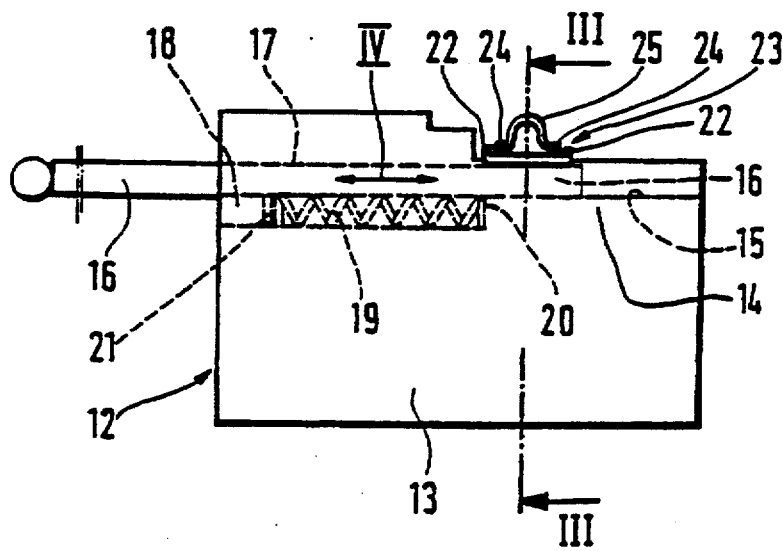

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 4 are determined to be patentable as amended.

Claims 2, 3 and 5–17, dependent on an amended claim, are determined to be patentable.

New claims 18 and 19 are added and determined to be patentable.

1. A cleaning cassette for cleaning a read/write head of a magnetic tape recorder, said cassette comprising:
a cassette body;
a supporting member reciprocally housed in said cassette body, said supporting member having a support surface facing the read/write head of the recorder;
a cleaning device mounted on said support surface for cleaning said read/write head upon reciprocal movement of said supporting member *along an operating path of a magnetic tape*, said cleaning device including a cleaning member *secured at opposite ends to said supporting surface to form a curved body configuration with the curvature in a direction of movement and* having a smooth flexible cleaning surface, said cleaning surface curving generally outwardly from said support surface and having an elasticity such that reciprocal movement of said cleaning member past said read/write head *from side-to-side completely beyond said read/write head in each direction of movement of said cleaning member* results in said cleaning surface contacting said read/write head and matingly contouring about said read/write head to clean said read/write head in both directions of said reciprocal movement.

4. A cleaning cassette according to claim 1[, 2 or 3,] wherein said cleaning member has a retaining member, said cleaning member being mounted by said retaining member to a holder, said holder being mounted such that said cleaning member is displaceable transversely to the direction of said reciprocal movement of said supporting member.

*18. A cleaning cassette according to claim 2 wherein said cleaning member has a retaining member, said cleaning member being mounted by said retaining member to a holder, said holder being mounted such that said cleaning member is displaceable transversely to the direction of said reciprocal movement of said supporting member.*

*19. A cleaning cassette according to claim 3 wherein said cleaning member has a retaining member, said cleaning member being mounted by said retaining member to a holder, said holder being mounted such that said cleaning member is displaceable transversely to the direction of said reciprocal movement of said supporting member.*

* * * * *